United States Patent

[11] 3,610,442

| [72] | Inventors | Lee Dennis Butler<br>Kingsburg;<br>Jerry W. Welker, Selma, both of Calif. |
|---|---|---|
| [21] | Appl. No. | 828,883 |
| [22] | Filed | May 29, 1969 |
| [45] | Patented | Oct. 5, 1971 |
| [73] | Assignee | Sperry Rand Corporation<br>New Holland, Pa. |

[54] CABLE CONTROL FOR A BALE WAGON ROLLING RACK
7 Claims, 3 Drawing Figs.

[52] U.S. Cl. .................................................. 214/6 B,
214/8.5 A, 214/82
[51] Int. Cl. ...................................................... B65g 57/32
[50] Field of Search ............................................ 214/6 B, 8.5
G, 8.5 F, 8.5 A, 518, 519, 522, 82

[56] References Cited
UNITED STATES PATENTS

| 3,385,456 | 5/1968 | Snider ......................... | 214/6 B |
| 3,448,879 | 6/1969 | Van Der Lely ............... | 214/522 |
| 3,490,613 | 1/1970 | Eggenmuller et al. ........ | 214/6 B |
| 3,510,013 | 5/1970 | Best ............................. | 214/6 B |
| 3,515,291 | 6/1970 | Grey et al. .................... | 214/6 B |
| 3,521,762 | 7/1970 | Walters ........................ | 214/6 B |
| 3,502,230 | 3/1970 | Grey et al. .................... | 214/6 B |

Primary Examiner—Gerald M. Forlenza
Assistant Examiner—Robert J. Spar
Attorneys—Joseph A. Brown, John C. Thompson, James J. Kennedy and George C. Bower ABSTRACT: A bale wagon having a load-carrying bed with a movable rolling rack thereon, the rolling rack being adapted to support successive bale tiers placed on the load bed and to be movable in response to actuation of a hydraulic cylinder which is connected to the rolling rack between the load bed and a cable. Actuation of the cylinder results in movement of the rolling rack through relative lengthening or shortening of the cable.

CABLE CONTROL FOR A BALE WAGON ROLLING RACK

BACKGROUND OF THE INVENTION

This invention relates generally to automatic bale-stacking wagons and specifically to bale wagons having a movable rolling rack thereon which is power operated to move in a fore-and-aft direction relative to said wagon.

In the past, bale wagons of the type shown and described in U.S. Pat. No. 2,848,127 issued to Grey on Aug. 19, 1968, have been provided with a movable rolling rack on the bale-carrying bed which was provided to support the bale tiers as they were successively loaded on the bed and during subsequent transport of a completed bale stack to a discharge station. The rolling racks were normally spring biased against the load so that when the load was removed from the bed the rack would reposition itself at the forward end of wagon load bed ready for the next stacking operation. The bias of the spring would be overcome with the introduction of each successive bale tier from the transfer table and the rolling rack would be forced rearwardly one bale width until the load bed was completely full and the rolling rack assumed its most rearward position on the bed.

This type of rolling rack was sufficient for the type of wagon which was capable only of stacking and/or retrieving operations. However, with the next generation of bale wagons, wagons which would automatically unload bales from the wagon one bale at a time in addition to stacking and retrieving, it was found necessary to provide a rolling rack which was power operated in either direction on the load bed, with or without a load of bales. This type of single-bale-unloading wagon has been described in a copending application Ser. No. 755,141, filed Aug. 26, 1968, and assigned to the present assignee.

SUMMARY OF THE INVENTION

Accordingly, it is a primary object of the present invention to provide a bale wagon rolling rack with power-operated control means for actuating the rolling rack in a fore-and-aft direction on the load bed.

Another object of the invention is to provide a rolling rack control which includes a double-acting hydraulic cylinder which is operatively connected to the rolling rack by means of a cable which has both its ends connected to the load bed.

Another object of the invention is to provide an actuating means for selectively regulating the amount of hydraulic fluid directed to the cylinder.

A further object of the invention is to provide an actuating means which is simultaneously operatively connected to the bale unloading means so that the rolling rack and unloading means cooperate to discharge bales from the wagon one bale at a time.

A still further object of the invention is to provide an interlocking means which is associated with the actuating means to prevent movement of the rolling rack support when the bale-unloading means is in one of its operative modes.

Other objects of the invention will be apparent hereinafter from the specification and from the recital in the appended claims.

DESCRIPTION OF THE PREFERRED EMBODIMENT

Figure 1:
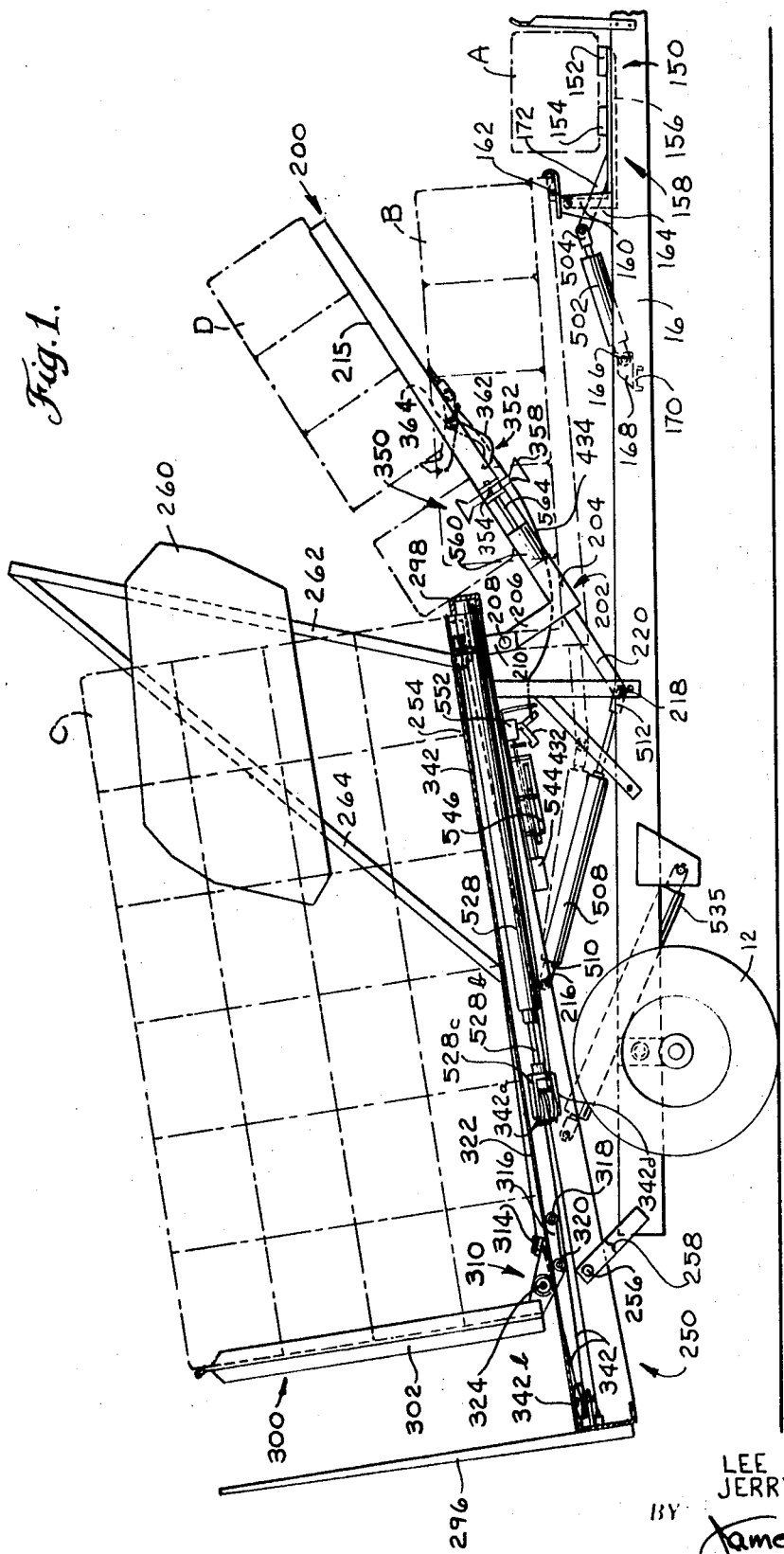
FIG. 1 is a side elevational view with the transfer table shown in full lines in its single-bale-unloading position and in dot-dash lines in its normal tier-forming position.

Referring now to the drawings, and specifically to FIG. 1, the bale wagon of this invention is provided with a chassis, indicated generally as 10, mounted on a pair of wheels, only the right wheel 12 being shown in FIG. 1. The chassis is formed of left and right longitudinally extending rails 16 (only one rail being shown). Although it is not specifically shown, the forward ends of the longitudinally extending rails 16 converge in a clevis assembly which adapts the wagon to be secured to a tractor, or other towing vehicle, located at the very front thereof. Power for the wagon is obtained from the tractor power takeoff in a conventional manner, but not specifically shown.

Mounted at the forward end of the chassis and extending transversely thereto is a first receiving table generally indicated by the numeral 150. The receiving table 150 is comprised of two transversely extending beams 152 and 154 which are mounted on a forwardly extending horizontal portion 156 of an L-shaped structure indicated generally at 158. The L-shaped structure includes a rear upwardly extending leg portion 160 which is pivotally secured at 162 to spaced brackets 164, only one shown, mounted on the right- and left-hand side rails 16. A hydraulic cylinder 502 is pivotally secured by means of a pivot pin 166 to the forwardly extending leg 168 which is mounted on a transverse frame member 170. The rod end 504 of the cylinder 502 is pivotally secured to an arm 172 which is welded, or otherwise secured, to the L-shaped member 158 of receiving table 150. As the cylinder 102 is extended, the receiving table 150 will be swung upwardly about its pivot point 162 transferring any bales which have been accumulated on the table (for example bale A) onto the second, or transfer table 200. The transferred bale A will assume the position shown at B in FIG. 1.

It will be understood by those skilled in the art, that the bales A are first introduced to receiving table 150 by means of a pickup, not shown, which lifts bales from the ground and directs them to the receiving table. The pickup means, well known in the art, is more fully disclosed and described in the U.S. Pat No. 3,300,424, to Grey et al. issued July 11, 1967.

The transfer table 200 is also mounted on a pair of L-shaped structures 202, only one being shown, each having a forwardly extending leg portion 204 and an upwardly extending rear leg portion 206 which is disposed at right angles to the lower leg portion 204. Each of the upwardly extending leg portions 206 are secured by pivot pin 208 to a depending lug 210 mounted on the forward end portion 252 of load bed 250. A bed surface 215 of the transfer table 200 is formed across the legs 204 and provides a surface upon which bale tiers are formed. When the transfer table 200 is in its normal tier-forming position, it is disposed in the position shown by the dot-dash lines shown in FIG. 1. When the requisite number of bales B have been accumulated on table 200, forming a tier of bales thereon, a hydraulic cylinder 508 is actuated, by trip means not shown, so that it extends and causes the table 200 to swing upwardly about its pivot point 208. In this manner, the bale tier formed on the transfer table is transferred to a rearwardly disposed load bed, or load table 250. Anchor end 510 of cylinder 508 is secured by means of a pivot pin 216 to the load-carrying bed 250. The rod end 512 of cylinder 508 is pivotally connected by means of a pivot pin 218 to a rearwardly extending member 220, which is fixed by its forward end to the rear portion of the L-shaped structure 202.

The load table, or load carrying bed 250, includes a platform assembly 254 which is mounted for swinging movement about a pair of transversely rearwardly disposed pivot pins 256. The pivot pins are supported on upwardly and rearwardly extending brackets 258 which are secured to the rear end of the longitudinally extending frame members 16. As before, only one of these members is shown. As the stack is formed on load bed 250, the second table 200 is swung upwardly to deposit its tier of bales B upon the load bed, whereupon the bales B assume the position shown at C in FIG. 1. As the first bale tier is deposited on the bed, a rolling rack 300 is contracted by the bales and forced rearwardly. Successive tiers of bales placed on the load bed will cause a continued rearward movement of the rack. The bale tiers are laterally confined by right- and left-hand side shields 260, only the right-hand side shield being shown in FIG. 1. Each of the side shields 260 being supported by upwardly extending front and rear struts 262 and 264, respectively.

A plurality of upwardly extending forks 296 are mounted at the rear of the platform assembly 254. These forks 296 are mounted in fixed spaced-apart relation and limit the rearward movement of the rolling rack.

Figure 2:
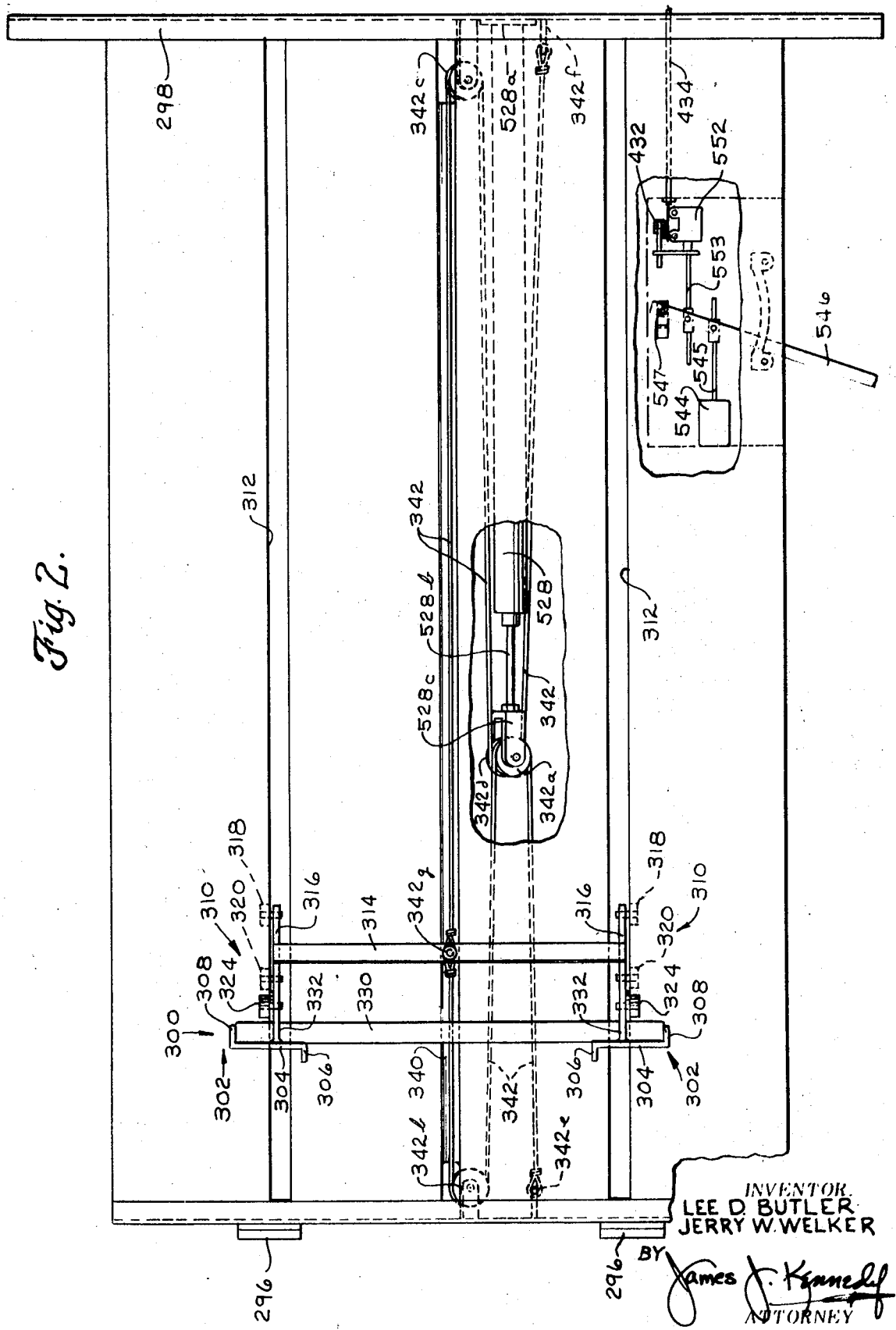
FIG. 2 is a plan view of the load bed and the rolling rack with portions of the load bed shown cut away to illustrate the cable and cylinder and the actuating means.

The rolling rack 300 is mounted on the platform assembly 254 of the load-carrying bed 250 and is adapted to support a stack of bales in a manner best shown in FIG. 1. The rolling rack is comprised of two spaced-apart forks 302, as shown in FIG. 2, which are mounted for movement in a fore-and-aft direction along platform 254. Each fork 302 includes a transversely extending web portion 304, a rearwardly extending inner aligning portion 306 and a forwardly extending outer portion 308 which is adapted to dig into the bales loaded against the fork and provide lateral stability therefor. A pair of trolley assemblies 310 are adapted to carry the forks 302 for movement along platform 254. Each trolley assembly 310 is adapted to run in a groove 312 formed in the platform assembly as shown in FIG. 2. A member 314, extending transversely to the grooves 312, connects each of the trolley assemblies, as shown in the drawings. Each assembly 310 includes a longitudinally extending member 316 which is welded or otherwise fixed to an end of transverse member 314. Front and rear lower rollers 318 and 320, respectively, are mounted on the member 316 in a conventional fashion, the roller being adapted to contact the lower surface 322 of the platform assembly 254 adjacent the fore-and-aft extending grooves 312. An upper rear roller 324 is also mounted on member 316, and is adapted to contact the upper surface 326 of the platform assembly 254. With this construction, then, it will be evident that member 316 may move only in a fore-and-aft direction, since its vertical movement is limited by rollers 318, 320 and 324, and the transverse movement of the member 316 is limited by member 314 and the outer edge of groove 312.

Each of the forks 302 is welded to a transversely extending member 330 which is triangular in cross section, the outer flange 308 being welded to the end of member 330. A pair of forwardly extending mounting brackets 332 are welded at their rearward ends to the triangular frame member 330 and pivotally secured by the forward ends to the members 316, by means not shown.

The rolling rack is adapted to be advanced forwardly and rearwardly by means of a cable 342 which is connected to the rolling rack between the bed means 250 and a double-acting hydraulic cylinder 528. During the loading operation, as tiers of bales are loaded onto the load bed, fluid is displaced from the cylinder through a relief valve 534 and is directed back to a reservoir 514 to permit the rack to be moved rearwardly as the tiers of bales are loaded onto the forward portion of the bed. The cylinder also may be positively controlled for either forward or reverse movement of the rolling rack as will be described in detail hereinafter.

When the operator of the bale wagon desires to unload his wagon one bale at a time, the bale tiers C are moved from the bale carrying bed 250 back onto the now inclined transfer table 200, where a cross conveyor 350 engages the end bale of the lowest layer of bales and shifts the bales to the right for discharge. A bale-engaging means 352 has previously engaged the layers of bales above the lowermost layer to be discharged, as illustrated in FIG. 1, and shifted them upwardly on the bed surface 215. The cross conveyor, is comprised, in part, of a conveyor chain 354 having a pair of paddles 358 mounted thereon. The paddles 358 are adapted to contact the left-hand end of the bale layers and shift them to the right for discharge (the bales would be directed at you when viewing FIG. 1). The bale-engaging hooks 352 are controlled by the conveyor 350 so that they will assume a first operative mode in the up position, or bale-engaging position, separating the upper bales from the lower layer of bales and a second operative mode, or retracted position. The operation has been more fully described in the aforementioned application Ser. No. 755,141. When the transfer table 200 is in its inclined or single-bale-unloading position, as shown in FIG. 1, the bales disposed above the discharged layer will shift downwardly as the bale hooks are retracted until they engage box beam 298, mounted at the forward edge of load bed 250. The box beam member extends laterally outwardly of each side of the platform assembly, as shown in FIG. 2, to provide additional support for the bales being discharged.

The bale-engaging means 352 are comprised of a plurality of hooks 362 which are secured to a rotatable rock shaft 364. Shaft 364 is journaled beneath the surface of transfer bed 200 by means not shown. The bale hooks 362, only one being shown, are adapted to pivot upwardly through apertures, not shown, in the surface of transfer bed 200 to engage bales, as shown by the dot-dash lines in FIG. 1. The bale hooks have a first operative mode, or position, wherein they extend upwardly through the table and engage the upper bales of a tier separating the upper bales from the lower bales as shown. The second operative mode, or position, is a retracted position shown by the solid lines in FIG. 1.

Figure 3:
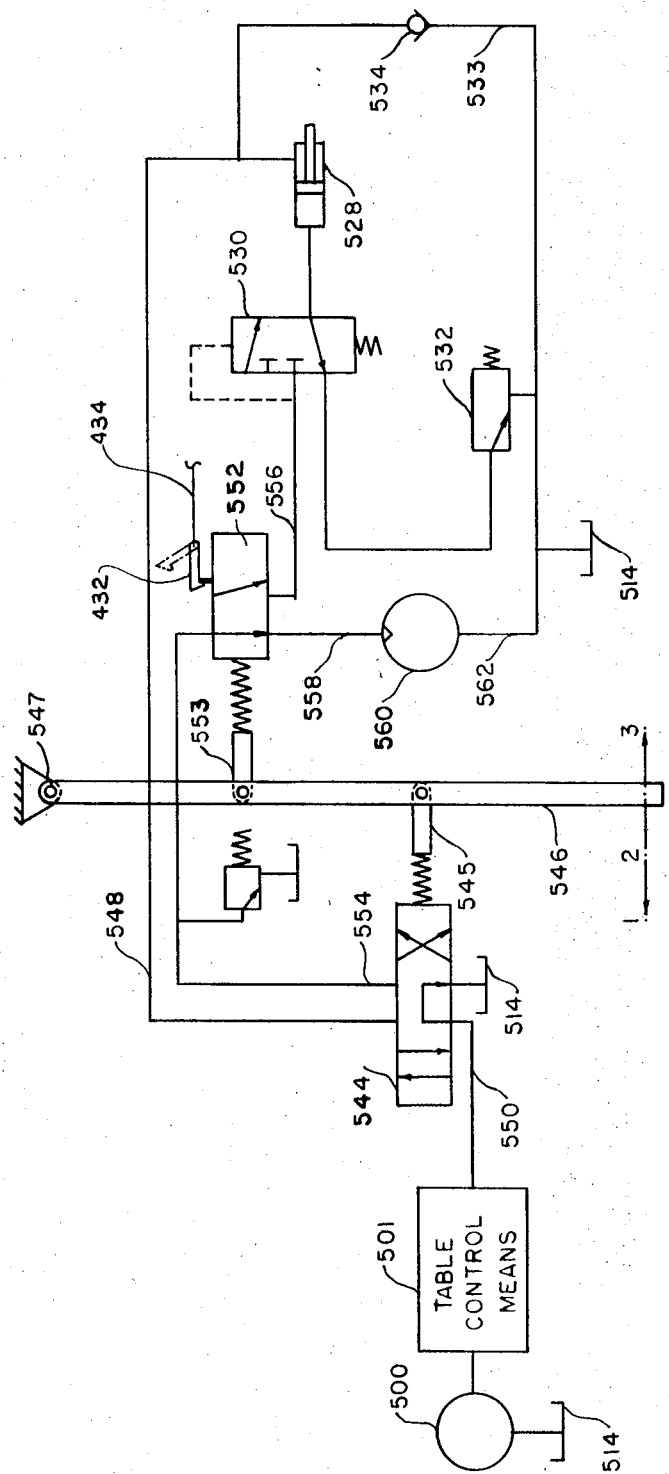
FIG. 3 is a schematic view of the various hydraulic components necessary for operation of the rolling rack.

The operation of the bale wagon can be best described as follows, referring to FIGS. 1—3 of the drawings. As tiers of bales are formed on the transfer bed 200 and are lifted upwardly by the transfer bed 200 to load bed 250, they will first contact rolling rack 300 and force it rearwardly. The movement of the rolling rack is controlled by cylinder 528, the rack being interconnected by the cylinder by means of a cable 342. One end 342e of the cable 342 is connected to the rear end of platform assembly 354, with intermediate portions of the cable being disposed over first, second, third and fourth sheaves 342a, 342b, 342c and 342d respectively. A pulley mounting bracket 528c is disposed at the end of cylinder rod 528b, as shown in FIG 2. Sheaves 342a and 342d are rotatably mounted in side by side relation in bracket 528c, while sheave 342b is mounted at the rear end of platform assembly 254 and sheave 342c is mounted at the forward end of the platform assembly. The cylinder 528 is fixedly mounted to the forward end of the platform assembly 254 at its anchor end 528a. An intermediate portion of the cable 342, between sheaves 342b and 342c, is fixedly secured to the transverse frame member 314, as shown in FIG. 2 at 342g. As the tiers of bales are loaded onto the load bed, the rolling rack will be shifted rearwardly. During this operation, a control valve 530 is in its normal position, shown in FIG. 3, and fluid is discharged from the anchor end of cylinder 528 through a low-pressure relief valve 532, which acts as a brake to prevent the rolling rack from moving except when a new tier of bales is introduced onto the load bed. A portion of the displaced fluid will return to the rod end of the cylinder 528 through line 533 and check valve 534, while the balance of the fluid will return to a reservoir 514. When the load bed is fully loaded, the forks 302 will overlie the forks 296 mounted on the platform assembly 254, with the rearwardly extending flange portion 306 being disposed to the inside of forks 296.

When the load-carrying bed has been fully loaded, the load can be transferred to the ground in the form of a composite stack by actuation of the cylinder 535, causing table 250 to pivot to a vertical position (not shown) with respect to the wagon chassis structure about its pivot point 256. Forward movement of the wagon with the table 250 in this position will result in the stack being placed on the ground in a composite form. The entire stack may be retrieved in a similar but reverse operation, by backing the wagon up to the stack so that forks 296 and 302 slip under the stack, and support the bales as the load-carrying bed 250 is returned to the position shown in FIG. 1.

When a single-bale-unloading operation is desirable, it is first necessary to position the transfer table 200 in its inclined single-bale-unloading position shown by the solid lines in FIG. 1. This is done in a conventional manner by actuating cylinder 208. Once the second table has been positioned in its inclined relation to the bale wagon chassis structure, it is necessary to advance the rolling rack 300 to deposit a tier of bales on the second table 200. This is accomplished by extending the rolling rack cylinder 528 which will cause the mid portion of cable 342 to move forwardly. The cylinder 528 is controlled through a control lever 546 and various control valves 544, 552 and 530. When the control lever 546 is shifted all the way to the rear (position 1 in FIG. 3) the spools and valves 544 and 552 will likewise be shifted to the rear causing fluid under pressure to flow from the control valve 544 through line 554 and valve 552 into line 556. This will cause the shuttle valve 530 to be shifted from its normal position, shown in FIG. 3, to a position where the fluid may then flow through valve 530 from line 556 into the anchor end of the rolling rack cylinder. As the rolling rack is advanced, the forwardmost tier of the bale stack will pass over a channel member 298 at the forward end of assembly 254 and fall onto the second table 200 assuming the position shown at D.

After the bale tier has fallen onto the transfer table 200, the rolling rack is stopped and a motor 560, which drives the cross conveyor 350 is started. This is accomplished by shifting lever 546 to an intermediate rear position (position 2 in FIG. 3) so that the spool within valve 552 is shifted to its normal forward position, as shown in FIG. 3, while the spool within valve 544 is maintained in its rearward position. Fluid now flows from line 554 through valve 552 into line 558 and then to the rotary hydraulic motor 560. Oil is discharged from motor 560 through line 562 into reservoir 514. The motor 560 has an output shaft 564 which is connected in driving relationship to a sprocket, not shown, over which the conveyor chain rides. Rotation of the cross conveyor will result in actuation of the bale engaging means 352 and with the paddles 358 engaging the bales and discharging them from the wagon.

As the bale tiers are transferred back to the transfer table, the bale hooks 362 are in their second operative position, retracted below surface 215 of the transfer table. They are actuated to the first operative position, or the bale-engaging position, in response to movement of the conveyor 350, by means not shown. After the lowest layer of bales has been discharged from the transfer table, the bale hooks will be caused to retract beneath surface 215 of the table to permit the next to lowest layer of bales to assume the lowest position. Continued movement of the chain will then cause the hooks to swing upwardly engaging the next layer of bales separating them from the lowest layer so that the now lowest bales may be readily discharged. After the last layer of bales has been discharged from the bale tier deposited on the table, the rolling rack is then advanced forwardly to deposit another tier of bales upon the second table for subsequent discharge in a similar manner, one bale at a time.

Means are provided in association with control means comprising the control lever 546 and valves 544 and 552, to insure that the rolling rack cannot be advanced toward the forward end of the bale wagon except when the bale hooks are in their lowered position. The motor 560 and the rolling rack cylinder 528 cannot be driven at the same time. The valve 552 directs fluid from line 554 to either cylinder 528 or to motor 560. When the actuation lever 546 is in its intermediate rear position (2 in FIG. 3) the motor 560 will be driven. When the lever is shifted all the way to the rear (1 in FIG. 3) the valve spool of valve 552 will shift to the rear only if the hook are in their lowered position. A latch 432, holds the valve 552 in its forward position, except when released by cable control 534. The forward end of the cable control 534 is connected to one side of the rockshaft 364, by means not shown. The control cable will release the latch 532 only when the rockshaft 364 has been rotated to its fullest extent in the clockwise direction, with the hooks being disposed in their second operative mode. Once the latch releases the valve permitting it to shift to the rear, the conveyor will stop.

While this invention has been described in connection with a single embodiment thereof, it will be understood that this embodiment is capable of modification and that this application is intended to cover any variations, uses, or adaptations following, in general, the principles of the invention including such departures from the present disclosure as come within the known or customary practice in the art to which the invention pertains, and as fall within the scope of the invention or the limits of the appended claims.

Having thus described our invention, what we claim is:

1. In a bale wagon comprising:
  a wheel-supported frame structure adapted for travel over the ground;
  bed means on said frame structure, said bed means adapted for receiving and accumulating successive tiers of bales at one end thereof to form a stack thereon;
  an unloading station disposed adjacent said bed means for receiving bale tiers from said bed means, said unloading station comprising a plurality of hooks for engaging a first portion of a tier and separating that first portion from a second portion, and a cross conveyor for conveying the second tier portion from the discharge station without interference from the first tier portion;
  a rolling rack means movably mounted on said bed means for supporting said stack during movement along said bed means;
  means operatively connected to said rolling rack for actuating said rolling rack; and
  control means simultaneously operatively connected to said rolling rack and the hooks and cross conveyor of said unloading station, said control means being adapted to regulate movement of said rolling rack, hooks and cross conveyor for single-bale unloading.

2. In a bale wagon, as recited in claim 1, wherein said means for actuating said rolling rack comprises a hydraulic cylinder and a cable, said cylinder being fixed by one end to said bed means and movably connected to said cable by the other end, said cable being fixed at each end to said bed means and intermediate the ends thereof to said rolling rack whereby movement of said cylinder causes movement of said rolling rack.

3. A bale wagon as recited in claim 1 wherein said rolling rack and cross conveyor are hydraulically actuated and controlled by a pair of valves having a common control lever.

4. A bale wagon as recited in claim 3 wherein said hooks are operatively actuated in time relationship relative to the movement of said cross conveyor.

5. In a bale wagon comprising:
  a wheel support frame structure adapted for travel over the ground;
  bed means on said frame structure, said bed means adapted for receiving and accumulating successive tiers of bales at one end thereof;
  means movable on said bed means for supporting said successive bale tiers during movement along said bed means;
  means associated with said bed means for unloading, said unloading means comprises bale-engaging means having first and second operative positions and conveyor means for discharging bales from the wagon one bale at a time;
  actuating means operatively connected to said support means, said actuating means comprises a hydraulic cylinder and a cable, said cylinder being fixed by one end to said bed means and movably connected to said cable by the other end, said cable being fixed at each end to said bed means and intermediate the ends thereof to said movable support means, whereby movement of said cylinder causes movement of said movable support means; and
  control means simultaneous operatively connected to said actuating means and said unloading means for regulating the movement of each, said control means including an interlocking means cooperable with said unloading means for preventing movement of said support means when said bale-engaging means are in said first operative position.

6. A bale wagon as set forth in claim 5 wherein said bale-engaging means of said unloading means are operative to separate a first portion of a tier from a second portion such that said conveyor means may convey said second tier portion from said bale wagon without interference from the first portion.